United States Patent [19]

Stepp et al.

[11] Patent Number: 4,618,966

[45] Date of Patent: Oct. 21, 1986

[54] FREQUENCY SHIFT KEY MODULATOR

[75] Inventors: Elvin D. Stepp, Fairfield; Gary L. Claypoole, West Chester, both of Ohio

[73] Assignee: Cincinnati Electronics Corporation, Cincinnati, Ohio

[21] Appl. No.: 500,090

[22] Filed: Jun. 1, 1983

[51] Int. Cl.[4] .................. H04L 27/12; H03C 3/02
[52] U.S. Cl. ..................... 375/62; 364/721; 332/9 R; 328/14
[58] Field of Search ............... 375/62, 65, 51; 340/825.58, 825.48; 328/14, 186, 16, 17, 18; 332/9 R, 9 T, 11 R, 16 R, 16 T; 331/179, 74, 76, 51; 364/721; 179/84 T, 84 VF, 90 K; 370/110.2

[56] References Cited

U.S. PATENT DOCUMENTS

| | | | |
|---|---|---|---|
| 3,657,657 | 4/1972 | Jefferson | 328/186 |
| 3,665,314 | 5/1972 | Leuthold | 375/61 |
| 3,668,562 | 6/1972 | Fritkin | 375/62 |
| 3,706,855 | 12/1972 | Pitroda et al. | 370/110.2 |
| 3,740,669 | 6/1973 | Nahay | 375/62 |
| 4,083,008 | 4/1978 | Eschke | 375/62 |
| 4,159,526 | 6/1979 | Mosley, Jr. et al. | 364/721 |
| 4,192,007 | 3/1980 | Becker | 364/721 |
| 4,328,554 | 5/1982 | Manitone | 364/721 |
| 4,338,579 | 6/1982 | Rhodes | 375/62 |
| 4,349,887 | 9/1982 | Crowley | 364/721 |
| 4,365,201 | 12/1982 | Scott et al. | 328/14 |
| 4,486,846 | 12/1984 | McCallister et al. | 364/721 |

*Primary Examiner*—Benedict V. Safourek
*Attorney, Agent, or Firm*—Lowe, Price, LeBlanc, Becker & Shur

[57] ABSTRACT

A carrier wave is frequency modulated to one of M different output frequencies that deviate from the carrier wave frequency by $\pm k_1$, $\pm k_2 \ldots \pm k_q$. The carrier is modulated in response to a clocked digital signal having n data bits forming a data word, where $M = 2^n$. In response to the digital signal an n bit control signal is derived. $M/2$ clock frequencies synchronized with the clock data signal are simultaneously derived. An up-down counter responds to the control signal so that one bit of the control signal controls the counting direction of the counter and $(n-1)$ of the bits control which one of the $M/2$ frequencies is applied to a clock input of the counter. In response to the count in the counter, orthogonal sinusoidal like waves at one of the frequencies $k_1$, $k_2 \ldots k_q$ are derived. The $M/2$ clock frequencies are equal to $k_1 2^P$, $k_2 2^P \ldots k_q 2^P$, where P is the number of clock frequency bits in the counter. The orthogonal sinusoidal like waves at the selected frequency are vectorially combined with the carrier wave to derive a constant amplitude wave that deviates from the carrier frequency by the selected frequency $k_1$, $k_2 \ldots k_q$ in a direction controlled by the value of the one bit.

15 Claims, 2 Drawing Figures

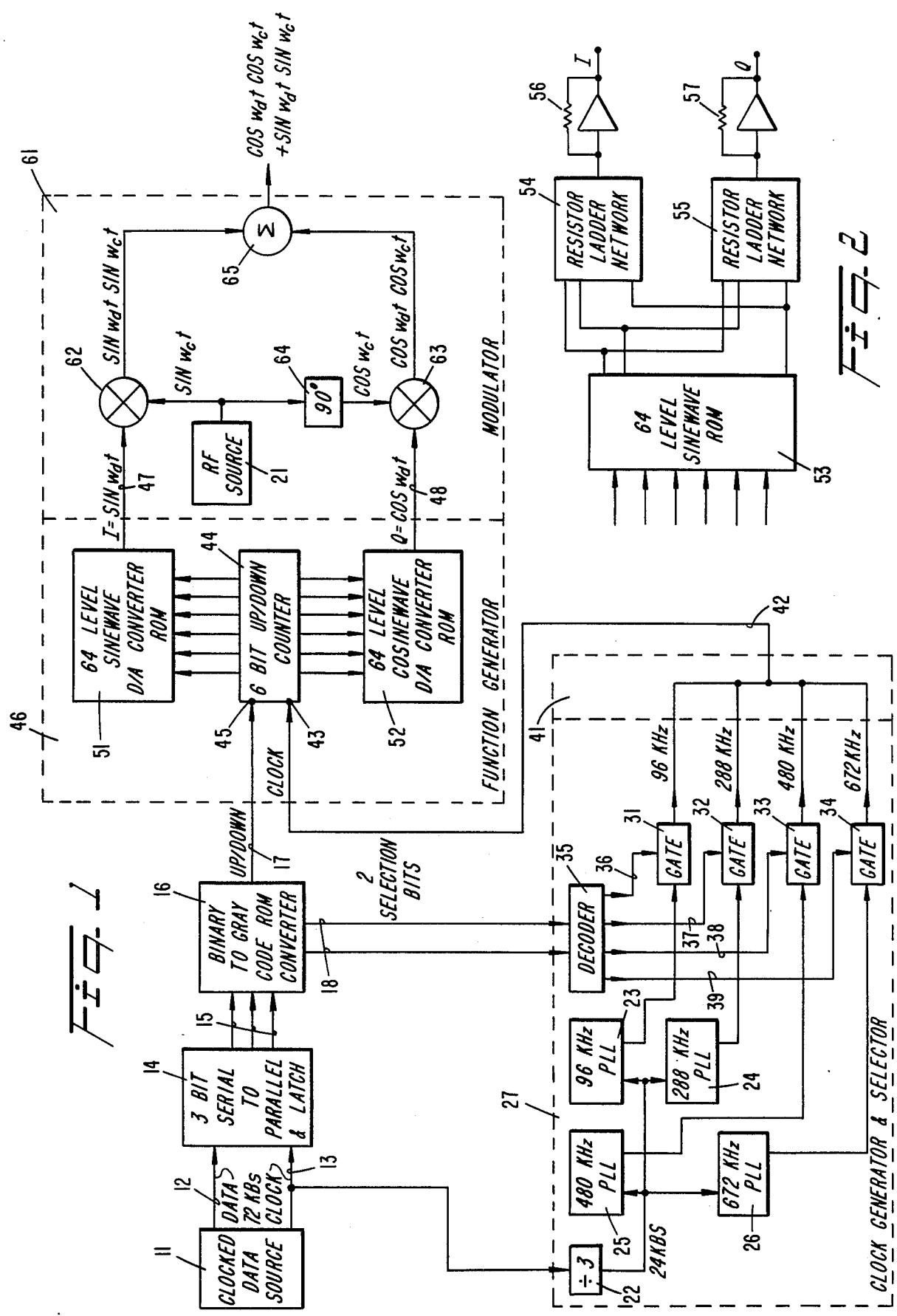

FREQUENCY SHIFT KEY MODULATOR

TECHNICAL FIELD

The present invention relates generally to frequency shift key modulators and more particularly to a frequency shift key modulator wherein a digital signal discretely controls the frequency of a modulating component combined with a carrier wave.

BACKGROUND ART

In frequency shift key (FSK) modulators, a carrier wave is shifted in frequency by discrete amounts in response to discrete input signals. Typically, prior art FSK modulators include a source for deriving a control input of a voltage controlled oscillator or a phase locked loop. It is desirable for an output signal of an FSK modulator to be phase coherent and stable. However, considerable circuitry is required in the prior art modulators to provide an FSK modulator output that is both phase coherent and stable. In addition, prior art phase locked loops have considerable settling times which must be considered. With existing phase locked loops, the amount of time necessary to change from one frequency to another is frequently relatively long.

It is, therefore, an object of the present invention to provide a new and improved frequency shift key modulator.

Another object of the present invention is to provide a new and improved frequency shift key modulator which achieves phase coherence and stability with few parts and relatively simple circuitry.

An additional object of the present invention is to provide a new and improved FSK phase coherent and stable modulator capable of instantaneously changing a carrier wave frequency.

DISCLOSURE OF INVENTION

In accordance with the present invention, a carrier wave is frequency modulated to one of several predetermined frequencies in response to an input signal having one of several predetermined values corresponding with the several predetermined modulated frequencies. In response to the input signal there is derived an indication having a value at any instant representing the phase angle of the frequency modulating the carrier wave. The phase angle representing indication cyclically ramps through an exact number of cycles of the modulating frequency between each adjacent change in the value of the input signal. The phase angle representing indication changes in a continuous, gradual manner each time the input signal changes in value. In response to the phase angle indication the frequency and phase of the carrier are sinusoidally changed by amounts respectively determined by the rate of change and value of the phase angle indication.

In accordance with one aspect of the invention, a carrier wave is frequency modulated in response to a digital signal by providing means responsive to the data signal for deriving variable frequency orthogonal sinusoidal like stepped waves. The variable frequency of the orthogonal sinusoidal like stepped waves is controlled so that the frequency is susceptible to sudden changes in discrete steps in response to successive values of the data signal. The orthogonal stepped waves are vectorially combined with the carrier wave to derive a constant amplitude AC wave having the carrier frequency and frequency modulated at the variable frequency.

In a preferred embodiment, the orthogonal waves are derived by up/down counter means. In response to the values of the data signal, the counting direction of the counter means is controlled, as is the counting rate of the counter means.

The carrier wave is susceptable of being modulated at M different frequencies, where $M = 2^n$, and n is a positive number equal to the number of bits in each word of the data signal.

The counting rate of the counter means is controlled by means for simultaneously deriving M/2 different frequencies, each synchronized to the data signal. Preferably, the M/2 different frequencies are derived by M/2 simultaneously operating phase locked loops, each synchronized to the frequency of the data source. In response to the data signal, one of the M/2 different frequencies is selected to control the counting rate of the counter means. The counting rate is controlled by responding to each n bit data word to derive a first signal having (n−1) bits and a second signal having one bit. The first signal having (n−1) bits selects one of the M/2 different frequencies, while the one bit second signal controls whether the counting means counts up or down. Preferably, the first and second signals are derived as a Gray code signal having n output bits; the most significant output bit forms the second signal while the remaining (n−1) output bits form the first signal. The use of a Gray code is advantageous to assure that a single error in a bit value of the digital input data signal results in a single bit error at low bit error rates.

In accordance with another aspect of the invention, a carrier wave is frequency modulated to one of M different output frequencies that deviate from the carrier wave frequency by $\pm k_1, \pm k_2 \ldots \pm k_q$. The deviation is controlled by a clocked data signal having n data bits forming a data word, where $M = 2^n$. In response to the clocked digital signal an n bit control signal is derived. M/2 simultaneously derived clock frequencies are synchronized with the clocked data signal. Up-down counter means responds to the control signal so that one bit of the control signal controls the counting direction of the counter means and (n−1) of the control signal bits determine which one of the M/2 frequencies is applied to a clock input of the counter means. In response to a count in the counter means orthogonal sinusoidal like waves at one of the frequencies $k_1, k_2 \ldots k_q$ are derived. The M/2 clocked frequencies are equal to $k_1 2^P, k_2 2^P \ldots k_q 2^P$, where P is the number of clocked frequency bits in the counter means. The orthogonal sinuooidal like waves at the one frequency are vectorially combined with the carrier wave to derive a constant amplitude wave that deviates from the carrier wave frequency by the selected one of $k_1, k_2 \ldots k_q$; the deviation direction is controlled by the value of the one bit.

A means for vectorially combining preferably includes first and second signal multipliers respectively responsive to the orthogonal sinusoidal like waves at the selected frequency and orthogonal displaced waves at the carrier frequency to derive a pair of orthogonally related output waves. The orthogonally related output waves are linearly combined to derive the frequency shift key modulated output wave.

The orthogonal sinusoidal like waves are preferably stepped waves having $2^P$ levels. The orthogonal sinusoidal like waves are derived by memory means having P input terminals and $2^P$ output terminals. The P input terminals are respectively responsive to the P bits in the counter means. First and second resistor ladder networks, each having $2^P$ input terminals, respond to the signals at the $2^P$ output terminals. The memory means and first and second resistor ladder networks are arranged so that the first and second networks respectively derive signals having amplitudes determined by the sine or cosine of an angle represented by the bits in the counter means.

In the preferred embodiment of the invention, described infra, the clocked data source derives three data bit words. Two of the bits control selection of one of four frequencies simultaneously derived from four phase locked loops synchronized to the clocked data bits. The selected frequency is supplied to a clock input of a six bit up/down counter, the counting direction of which is determined by the value of a remaining bit derived from the clocked data source. The contents of the six bit up/down counter are applied to a digital to analog converter system which derives a pair of orthogonally related sinusoidal like waves, each having 64 steps. Thus, in the preferred, described embodiment, $M=8$, $n=3$, and $P=6$. It is to be understood, however, that these are merely exemplary numerical values and that other appropriate numerical values can be employed.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a block diagram of a preferred embodiment of the invention; and

FIG. 2 is a block diagram of a portion of a function generator included in FIG. 1.

BEST MODE FOR CARRYING OUT THE INVENTION

Reference is now made to FIG. 1 of the drawing wherein clocked data source 11 derives a serial three-bit digital data signal word on lead 12, which bits are synchronized with and occur at the same frequency as 72 kilobit per second clock pulses supplied by the source to lead 13. The data and clock signals on leads 12 and 13 are applied to three-bit serial to parallel converter and latch network 14 for deriving a three-bit parallel digital signal that is coupled by bus 15 to binary to Gray code read only memory (ROM) converter 16. Converter and latch network 14 respond to the signals on leads 12 and 13 so that the signal on bus 15 has a constant value while the three serial bits of a data word are supplied by source 11 to network 14. The three-bits on bus 15 represent the three serial data bits forming a single data word derived from source 11; the three-bits on bus 15 represent the decimal numerals 0–7, in binary code.

Converter 16 responds to successive three-bit binary coded words to convert them into successive three-bit Gray coded words in accordance with the usual conversion, as indicated by Table I.

TABLE I

| Decimal | Binary | Gray |
| --- | --- | --- |
| 0 | 000 | 000 |
| 1 | 001 | 001 |

TABLE I-continued

| Decimal | Binary | Gray |
| --- | --- | --- |
| 2 | 010 | 011 |
| 3 | 011 | 010 |
| 4 | 100 | 110 |
| 5 | 101 | 111 |
| 6 | 110 | 101 |
| 7 | 111 | 100 |

Gray code converter 16 is employed because a one-bit error in a word of clock data source 11 is reflected as a one-bit error in the output of converter 16, to minimize the bit error rate of a signal derived by the FSK modulator of FIG. 1. Converter 16 derives a three-bit output, such that the most significant output bit is supplied by the converter to lead 17, while the two least significant output bits are supplied to two-bit bus 18.

The 72 kilobit per second clock signal on lead 13 synchronizes the simultaneous derivation of four frequencies, one of which is selected to control the frequency for modulating RF source 21; the selection is in response to the value of the two binary bits on bus 18. In particular, the clock signal on lead 13 is supplied by divide by three frequency divider 22 to phase locked loops 23, 24, 25 and 26, included in clock generator and selector network 27. Phase locked loops 23, 24, 25 and 26 are synchronized simultaneously with each change in the three-bit parallel signal derived from network 14 by the 24 kilobit per second output of frequency divider 22; phase locked loops 23, 24, 25 and 26 are designed to derive output waves at 96 kiloHertz, 288 kiloHertz, 480 kiloHertz and 672 kiloHertz, respectively.

The four phase locked and synchronized waves derived from phase locked loops 23–26 are respectively applied to gates 31–34, so that the output of one of the phase locked loops is selected to the exclusion of the remaining phase locked loops. To these ends, the two-bit binary signal on bus 18 is decoded into one of four signals by decoder 35, having output leads 36–39 respectively applied as control inputs to gates 31–34. Signals at output terminals of gates 31–34 are combined in wired OR gate 41, having an output lead 42 applied to clock input terminal 43 of six-bit up/down counter 44.

Counter 44 includes up/down input terminal 45, connected to lead 17. The value of the binary signal on lead 17 controls whether counter 44 is counting up or down. The count rate of counter 44 is determined by the frequency selected by gates 31–34 and supplied by lead 42 to the counter clock input terminal 43.

Counter 44 is part of function generator 46 which derives two 64 level stepped orthogonal sinusoidal like waveforms, one of which is considered as a sine wave applied to lead 47, and the other of which is considered as a cosine waveform applied to lead 48. The frequency of the waves applied to leads 47 and 48 is determined by the frequency of the wave coupled to lead 42, and is equal to the frequency of the wave coupled to lead 42 divided by $2^6$, i.e., the frequency division factor of counter 44, which is equal to 64.

At any instant of time, the count stored in counter 44 represents the phase angle of the frequency on leads 47 and 48. The phase angle indication in counter 44 is ramped at a rate determined by the frequency applied to clock input terminal 43. In response to a change in the frequency applied to terminal 43 the ramping rate of the phase angle changes. The phase angle in counter 44 does not change suddenly but changes continuously and gradually because the bits in the counter are advanced in the same order regardless of the input frequency on terminal 43. Thereby, the count in counter 44 represents the phase angle of the signal on leads 47 and 48, and the rate of change of the count in counter 44 determines the frequency of the waves on leads 47 and 48. The direction of phase change of the angle in counter 44 is determined by the binary value of the bit on lead 17.

During a 41⅔ microsecond interval while a single three-bit binary bit is resident in converter and latch network 14, phase locked loops 23, 24, 25 and 26 respectively derive exactly four, twelve, twenty and twenty eight cycles in synchronization with the data signal bits on lead 12. Thus, during each 41⅔ microsecond interval the phase indicating count in counter 44 is cyclically ramped through either exactly four, twelve, twenty or twenty eight identical cycles. Because of the numerical relationship between the frequencies of phase locked loops 23-26, the number of stages of counter 44, number of bits in a word on lead 12 and the frequency of the clock signal on lead 13, as well as the synchronism between the signals on leads 12 and 13 with the output waves of the phase locked loops, the count in counter 44 changes gradually each time a new 41⅔ microsecond interval starts. Because of these factors, there is phase coherence of the signals applied by counter 44 to leads 47 and 48, even at the end of each 41⅔ microsecond intervals when there is a change in the frequency of the signal supplied by gates 31-34 to lead 42.

Counter 44 includes six output stages, each supplying a separate binary signal in parallel to an input terminal of 64 level sine wave digital to analog converter 51 and 64 level cosine wave digital to analog converter 52. Converters 51 and 52 thus are supplied with the same signal bits by counter 44 to assure that the signals on leads 47 and 48 are in phase quadrature with each other. The phase quadrature signals on leads and 48 represent the components:

$$I = \sin \omega_d t$$

$$Q = \cos \omega_d t$$

where:
$\omega_d = 2 k = (2\pi i)/(64)$,
k = the frequency on leads 47 and 48,
i = the frequency on lead 42, and
t = time The rotation direction of $\omega_d$ is determined by the value of the bit on lead 17. While converters 51 and 52 are illustrated as separate elements, they preferably include a common element, as illustrated in FIG. 2, a block diagram of the apparatus responsive to counter 44 in a preferred embodiment.

Function generator 46 includes a 64 level sine wave read only memory 53 addressed by the six-bit phase indicating output of counter 44. Read only memory 53 is programmed so that in response to the six-bit address input thereof, one of 64 different output leads is selected, depending upon the phase angle associated with the value of the six-bit signal in counter 44. The 64 output leads of memory 53 are applied in parallel to resistor ladder networks 54 and 55, having switches and resistors connected to positive and negative DC potential sources in a known manner, so that networks 54 and 55 respectively derive DC analog voltages having instantaneous values respectively commensurate with the sine and cosine of the angle representing signal addressing memory 53. The analog signal voltages derived by ladder networks 54 and 55 are respectively applied to analog summing amplifiers 56 and 57.

The data representing, variable frequency, constant amplitude orthogonally phased voltages on leads 47 and 48 are non-linearly combined in modulator 61 with a carrier frequency $f_c$ derived from RF source 21 to derive a constant amplitude RF wave that deviates from the carrier frequency by k. To these ends, the signals on leads 47 and 48 are vectorially combined with the carrier wave derived from RF source 21, by supplying the signals on leads 47 and 48 to analog signal multipliers 62 and 63, respectively. Signal multipliers 62 and 63 respond to orthogonally phased signals at the carrier frequency, a result achieved by supplying the output of source 21 directly to one input of multiplier 62, and by supplying the output of source 21 to an input of multiplier 63 by way of 90° phase shifter 64. Signal multipliers 62 and 63 thereby respectively derive output signals representing:

$$\sin \omega_d t \sin \omega_c t, \text{ and}$$

$$\cos \omega_d t \cos \omega_c t$$

where
$\omega_c = 2\omega f_c$, and
$f_c$ = the carrier frequency of source 21.

The signals derived by signal multipliers 62 and 63 are linearly combined in analog summation network 65, which derives an output in accordance with:

$$\cos \omega_d t \cos \omega_c t + \sin \omega_d t \sin \omega_c t.$$

From the foregoing, if the frequencies derived from phase locked loops 23, 24, 25 and 26 are synchronized waves at frequencies of $k_1 2^P$, $k_2 2^P$, $k_3 2^P$ and $k_4 2^P$, where P is the number of stages in counter 44, the output signal of modulator 61 deviates from the carrier frequency of source 21 by $\pm k_1$, $\pm k_2$, $\pm k_3$ or $\pm k_4$. The value of k is determined by the two bits supplied by converter 16 to leads 18; the polarity of k is determined by the value of the binary bits supplied by converter 16 to lead 17.

For the specific situation illustrated in FIG. 1, the output signal of modulator 16 assumes one of eight different output frequencies, so that M = 8. To derive the eight different output frequencies ((M/2) = 4), four different phase locked loops 23-26 are required. The frequency shifts in the signal derived from modulator 61, which result in changing the frequency of the wave applied to lead 42, are $k = (i/2^P)$, where i is selectively one of 96 Hz, 288 kHz, 480 kHz, and 672 kHz, P = 6, and therefore k is selectively one of +1.5 kHz, −1.5 kHz, +4.5 kHz, −4.5 kHz, +7.5 kHz, −7.5 kHz, +10.5 kHz, and −10.5 kHz. Because the four clock frequencies derived by phase locked loops 23-26 are locked to the frequency of the data signal on lead 12, total synchronization is provided by the modulator. Because direct frequency modulation is accomplished by the circuitry included in modulator 61, the need for mixing is obviated. Because the orthogonal data representing signals on leads 47 and 48 are responsive to the phase angle indicated by counter 44, the frequency of the data signal components applied to modulator 61 are shifted in frequency simultaneously and instantly.

While there has been described and illustrated one specific embodiment of the invention it will be clear that variations in the details of the embodiment specifically illustrated and described may be made without departing from the true spirit and scope of the invention as defined in the appended claims.

We claim:

1. Apparatus for frequency modulating a carrier wave in response to a digital data signal comprising means responsive to the data signal for deriving variable frequency orthogonal sinusoidal like stepped waves, the variable frequency being controlled so that it is susceptible to changes in discrete steps in response to successive values of the data signal, and means for vectorially combining the orthogonal stepped waves and the carrier wave to derive a constant amplitude AC wave having the carrier frequency and frequency modulated at the variable frequency, wherein the means for deriving the orthogonal waves includes up/down counter means, means responsive to the data signal for controlling whether the counter means counts up or down and for controlling the counting rate of the counter means, wherein the carrier wave is susceptible of being modulated at M different frequencies, where $M = 2^n$ and n is a positive integer equal to the number of bits in each word of the data signal, the means for controlling including: means for simultaneously deriving M/2 different frequencies each synchronized to the data signal, and means responsive to the data signal for selecting one of the M/2 different frequencies to control the counting rate of the counter means.

2. The apparatus of claim 1 wherein the means for controlling includes means responsive to each n bit data word for deriving a first signal having $(n-1)$ bits and a second signal having one bit, the selecting means being responsive to the first signal, the second signal controlling whether the counting means counts up or down.

3. The apparatus of claim 4 wherein the means for deriving the first and second signals includes means for deriving a Gray code signal having n output bits, the most significant output bit forming the second signal, the remaining $(n-1)$ of the output bits forming the first signal.

4. The apparatus of claim 1 wherein the means for deriving the M/2 different frequencies includes M/2 simultaneously operating phase locked loops each synchronized to the frequency of the data source.

5. The apparatus of claim 1 wherein the means for vectorially combining includes first and second analog signal amplifiers respectively responsive to the orthogonal sinusoidal like waves and orthogonally displaced waves of the carrier frequency to derive a pair of orthogonally related output waves, and analog means for linearly combining the orthogonally related output waves.

6. Apparatus for frequency modulating a carrier wave to one of M different output frequencies that deviate from the carrier wave frequency by $\pm k_1$, $\pm k_2$ ... $\pm k_q$ in response to a clocked digital signal having n data bits forming a data word, where $M = 2^n$, comprising means responsive to the digital signal for deriving an n bit control signal, means for simultaneously deriving M/2 clock frequencies synchronized with the clocked data signal, up-down counter means responsive to the control signal so that one bit of the control signal controls the counting direction of the counter means and $(n-1)$ of the bits control application of one of the M/2 frequencies to a clock input of the counter means, means responsive to a count in the counter means for deriving orthogonal sinusoidal like waves at one of the frequencies $k_1, k_2 \ldots k_q$, the M/2 clock frequencies being equal to $2^P k_1, 2^P k_2 \ldots 2^P k_q$, where P is the number of clock frequency bits in the counter means, and means for vectorially combining the orthogonal sinusoidal like waves at the one frequency with the carrier wave to derive a constant amplitude wave that deviates from the carrier wave frequency by the selected one of $k_1, k_2 \ldots k_q$ in a direction controlled by the value of the one bit.

7. The apparatus of claim 6 wherein the means for vectorially combining includes first and second analog signal multipliers respectively responsive to the orthogonal sinusoidal like waves at the one frequency and orthogonally displaced waves of the carrier frequency to derive a pair of orthogonally related output waves, and means for linearly combining the orthogonally related output waves.

8. The apparatus of claim 6 wherein the orthogonal sinusoidal like waves are stepped waves having $2^P$ levels, the orthogonal sinusoidal like wave deriving means including: memory means having P input terminals and $2^P$ output terminals, the P input terminals being respectively responsive to the P bits in the counter means, first and second resistor ladder networks each having $2^P$ input terminals responsive to the signal at the $2^P$ output terminals, the memory means and first resistor ladder networks being arranged so that the first network derives a signal representing the sine of an angle represented by the bits in the counter means, the memory means and second resistor ladder network being arranged so that the second network derives a signal representing the cosine of the angle represented by the bits in the counter means.

9. The apparatus of claim 6 wherein the means for deriving the n bit control signal includes means for deriving the $(n-1)$ bits as the $(n-1)$ least significant bits of an n bit Gray code signal and for deriving one bit as the most significant bit of the n bit Grey code signal.I 10. Apparatus for frequency modulating a carrier wave to one frequency of several predetermined frequencies in response to an input signal having one of several predetermined values corresponding with the several predetermined frequencies comprising means responsive to the input signal for deriving an indication having a value at any instant representing the phase angle of the frequency modulating the carrier wave, the phase angle representing indication changing in a continuous gradual manner each time the input signal changes in value, said indication deriving means including: means for deriving a plurality of different frequencies synchronized to the input signal, an up/down counter, and means responsive to the value of the input signal for controlling the counting direction of said counter and for controlling which one of said frequencies is applied to a clock input of said counter, said counter deriving a multi-bit output representing the phase angle indication, and means responsive to the phase angle indication for sinusoidally changing the frequency and phase of the carrier by amounts respectively determined by the rate of change of the represented phase angle value and the phase angle value.

11. The apparatus of claim 10 wherein the indication deriving means includes counter means for deriving a multi-bit signal representing the phase angle, and means responsive to the input signal for controlling the rate at which the counter means is advanced.

12. The apparatus of claim 11 wherein the indication deriving means includes memory means having P input terminals and $2^P$ output terminals, the P input terminals being respectively responsive to P bits in the counter means, a resistor ladder network having $2^P$ input terminals responsive to the signal at the $2^P$ output terminals, the memory means and resistor ladder network being arranged so that the network derives a signal representing the sine of an angle represented by the bits in the counter means.

13. Apparatus for frequency modulating a carrier wave to one frequency of several predetermined frequencies in response to an input signal having one of several predetermined values corresponding with the several predetermined frequencies comprising means responsive to the input signal for deriving an indication having a value at any instant representing the phase angle of the frequency modulating the carrier wave, the phase angle representing indication changing in a continuous gradual manner each time the input signal changes in value, said indication deriving means including: means for deriving a plurality of different frequencies synchronized to the input signal, an up/down counter, and means responsive to the value of the input signal for controlling the counting direction of said counter and for controlling which one of said frequencies is applied to a clock input of said counter, said counter deriving a multi-bit output representing the phase angle indication, and means responsive to the phase angle indication for sinusoidally changing the frequency and phase of the carrier by amounts respectively determined by the rate of change of the represented phase angle value and the phase angle value, wherein the means for deriving the indication includes means for deriving first and second variable frequency orthogonal sinusoidal like waves at the same frequency, the frequency and phase angle of the orthogonal waves being determined respectively by the rate of change of the phase angle indication and the phase angle, the means for sinusoidally changing the carrier including means for vectorially combining the orthogonal waves and the carrier wave to derive a constant amplitude AC wave having the carrier frequency and frequency modulated at the variable frequency.

14. The apparatus of claim 13 wherein the means for vectorially combining includes first and second analog signal multipliers respectively responsive to the orthogonal sinusoidal like waves and orthogonally displaced waves of the carrier frequency to derive a pair of orthogonally related output waves, and means for linearly combining the orthogonally related output waves.

15. Apparatus for frequency modulating a carrier wave in response to a digital data input signal comprising means responsive to the data signal for deriving variable frequency orthogonal sinusoidal like stepped waves, the variable frequency being controlled so that it is changed in discrete steps with phase coherence in response to successive values of the data signal having different values, the variable frequency deriving means including: means for deriving a plurality of different frequencies synchronized to the input signal, an up/down counter, and means responsive to the value of the input signal for controlling the counting direction of said counter and for controlling which one of said frequencies is applied to a clock input of said counter, said counter deriving a multi-bit output representing the phase angle indication, and means responsive to the phase angle indication for sinusoidally changing the frequency and phase of the carrier by amounts respectively determined by the rate of change of the represented phase angle value and the phase angle value, and means for vectorially combining the orthogonal stepped waves and the carrier wave to derive a constant amplitude AC wave having the carrier frequency and frequency modulated at the variable frequency.

* * * * *